United States Patent
Hunter

(10) Patent No.: US 8,726,657 B2
(45) Date of Patent: May 20, 2014

(54) AIR TURBINE DRIVEN EGR PUMP FOR DIESEL ENGINES

(75) Inventor: Gary Hunter, Dexter, MI (US)

(73) Assignee: AVL Powertrain Engineering, Inc., Plymouth, MI (US)

( * ) Notice: Subject to any disclaimer, the term of this patent is extended or adjusted under 35 U.S.C. 154(b) by 693 days.

(21) Appl. No.: 12/785,071

(22) Filed: May 21, 2010

(65) Prior Publication Data

US 2010/0293944 A1    Nov. 25, 2010

Related U.S. Application Data

(60) Provisional application No. 61/180,486, filed on May 22, 2009.

(51) Int. Cl.
*F02B 33/44*    (2006.01)

(52) U.S. Cl.
USPC ........................... 60/605.2; 60/605.1; 60/624

(58) Field of Classification Search
USPC ..................................... 60/605.2, 605.1, 624
See application file for complete search history.

(56) References Cited

U.S. PATENT DOCUMENTS 7,591,131 B2    9/2009    Easley, Jr. et al.

OTHER PUBLICATIONS

U.S. Appl. No. 12/785,095, "Exhaust Power Turbine Drive EGR Pump for Diesel Engines," filed May 21, 2010.
Southwest Research Institute, "Low Emissions Potential of EGR-SCR-DPF and Advanced Fuel Formulations—A Progress Report," Oct. 2002.

*Primary Examiner* — Ching Chang
(74) *Attorney, Agent, or Firm* — Harness, Dickey & Pierce, P.L.C.

(57) ABSTRACT

A power plant includes an engine configured to receive charge air and produce exhaust. A first turbo machine is configured to be driven by the exhaust and drive a compressor that receives air. The compressor is configured to produce the charge air. A second turbo machine is configured to receive the charge air and rotationally drive a pump in response thereto. The pump is configured to receive an EGR from the exhaust and introduce the pumped EGR to the charge air. The power plant also includes an exhaust gas recirculation passage. The second turbo machine includes a turbine rotationally coupled to the pump. The turbine has an expanded air passage, and the pump is arranged in the exhaust gas recirculation passage. A pre-cooler is arranged in the expanded air passage and in the exhaust gas recirculation passage upstream from the pump.

7 Claims, 1 Drawing Sheet

AIR TURBINE DRIVEN EGR PUMP FOR DIESEL ENGINES

This application claims priority to U.S. Provisional Application No. 61/180,486, filed on May 22, 2009.

BACKGROUND

This disclosure relates to turbo diesel engines having exhaust gas recirculation.

Large diesel engines are used in locomotive and off-road applications. Diesel engines for these applications are in the range of 1-5 megawatts, for example. It is desirable to recirculate the exhaust gases into the charge air stream to reduce the emissions of the diesel engine.

The intake manifold pressure of large diesel engines is typically higher than the exhaust manifold pressure. As a result, the exhaust gases must be pumped into the charge air to recirculate the exhaust gases. Electric motors are typically used to drive the exhaust gas recirculation pump. Electric motors can be difficult to package and may result in a fuel consumption penalty for the overall efficiency of the diesel engine.

SUMMARY

A power plant is disclosed that includes an engine configured to receive charge air and produce exhaust. A first turbo machine is configured to be driven by the exhaust and drive a compressor that receives air. The compressor is configured to produce the charge air. A second turbo machine is configured to receive a portion of the charge air and rotationally drive a pump in response thereto. The pump is configured to receive an EGR from the exhaust and introduce the pumped EGR to the charge air.

In another aspect of the disclosure, the power plant includes an exhaust gas recirculation passage. The second turbo machine includes a turbine rotationally coupled to the pump. The turbine has an expanded air passage, and the pump is arranged in the exhaust gas recirculation passage. A pre-cooler is arranged in the expanded air passage and in the exhaust gas recirculation passage upstream from the pump.

BRIEF DESCRIPTION OF THE DRAWINGS

The disclosure can be further understood by reference to the following detailed description when considered in connection with the accompanying drawings wherein.

DETAILED DESCRIPTION

Figures 1, 2:
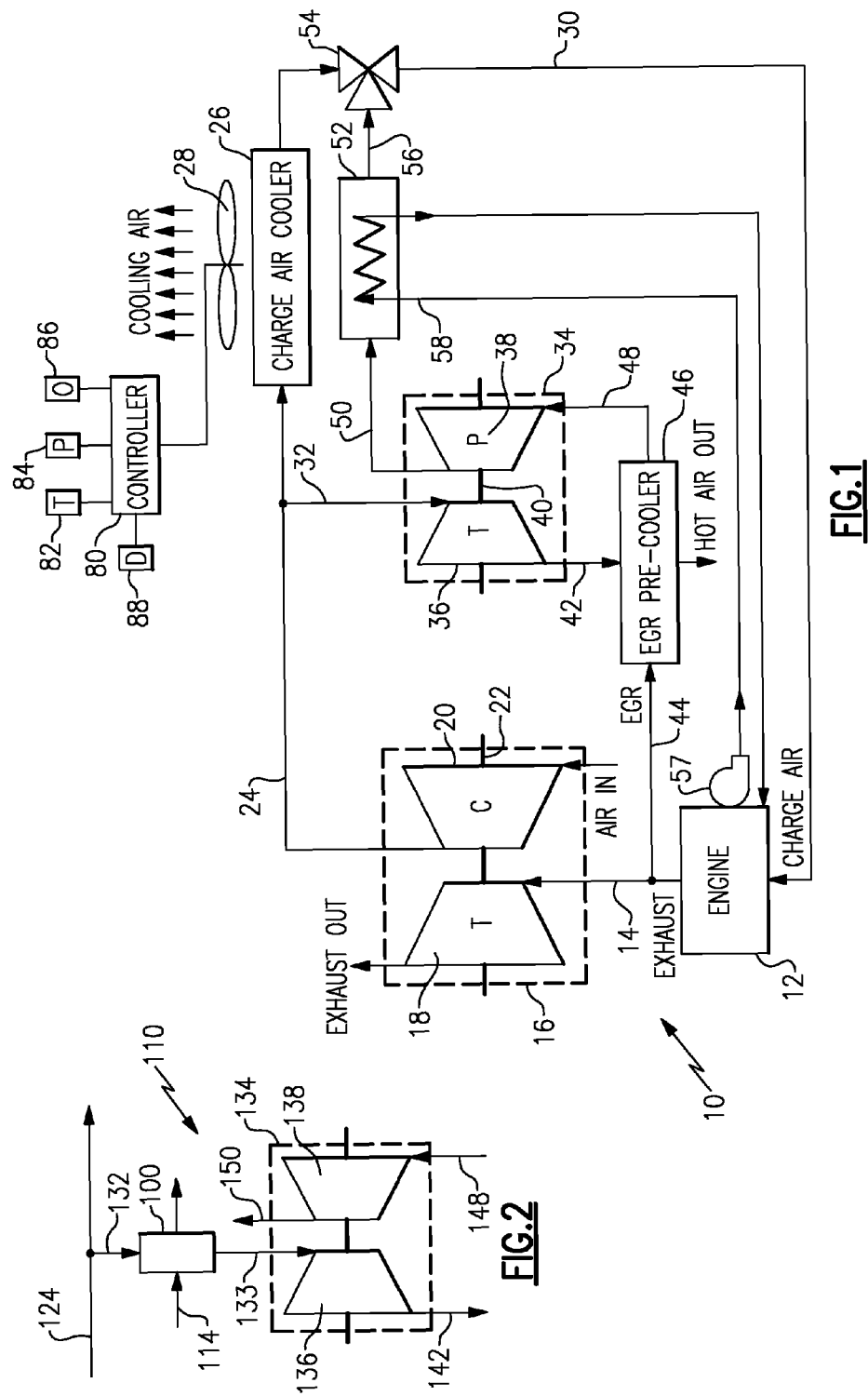
FIG. 1 is a schematic view of an example powertrain system using exhaust gas recirculation.
FIG. 2 is a schematic illustrating the use of an exhaust-to-air heat exchanger in the powertrain system illustrated in FIG. 1.

A power plant 10 includes an engine 12, which may be a large diesel engine. The engine 12 expels exhaust gases through an exhaust passage 14, which includes an exhaust manifold. The exhaust gases in the exhaust passage 14 drive a turbo machine 16. More specifically, the exhaust gases rotationally drive a first turbine 18 that is coupled to a shaft 22. A compressor 20 is coupled to the shaft 22 and is rotationally driven by the turbine 18 as the exhaust gases expand within the first turbine 18. The first turbine 18 may have a fixed geometry, variable geometry and/or a wastegate.

Intake air is received by the compressor 20, which produces compressed air or charge air. The compressed air exits the compressor 20 through a charge air passage 24 at about 200° C. in one example. The compressed air flows through a cooler 26 arranged in the charge air passage 24, which cools the compressed air by blowing air across the cooler 26 with a cooling fan 28. A controller 80 is programmed to selectively energize the fan 28 in response to inputs from temperature 82, pressure 84 and/or other sensors 86, for example, to regulate the temperature of the charge air at a predetermined condition arranged in the charge air passage 24. Cooled charge air from the cooled charge air passage 30 is provided to the intake manifold of the engine 12, which is schematically indicated by the arrowhead into the bottom of the engine 12 in FIG. 1.

In the example power plant 10, a portion of compressed air is provided through passage 32 to a second turbo machine 34. The second turbo machine 34 includes a second turbine 36 and a pump 38 coupled to a shaft 40. As the portion of compressed air 32 expands within the turbine 36, the pump 38 is rotationally driven. A flow control valve (not shown) may be arranged in the line providing the portion of compressed air to regulate the EGR flow rate. Alternatively or additionally, the second turbine 36 includes a variable geometry to regulate the flow therethrough. Expanded air exits the turbine 36 through expanded air passage 42 at approximately 100° C. The expanded air enters an optional EGR precooler 46, which receives EGR 44 from the exhaust 12. An engine coolant-to-exhaust heat exchanger may be used in place of the EGR pre-cooler 46, for example. The EGR is typically 500-600° C. The expanded air cools the EGR 44 to approximately 400-450° C. before the pre-cooled EGR 48 enters the pump 38.

Pumped EGR through pumped EGR passage 50 enters an EGR cooler 52 where it is cooled by a coolant in a coolant loop 58. The coolant 58 is a liquid coolant, which may be provided from the engine 12 by coolant pump 57, for example. Engine coolant typically is approximately 90° C. Cooled EGR 56 enters a mixer 54, which is arranged in the cooled charge air 30 stream. In this manner, EGR is pumped to the charge air, which is returned to the intake manifold of the engine 12.

In another example power plant 110 shown in FIG. 2. Like numerals are used to indicate like elements between the Figures. A portion of compressed air in passage 132 is provided to the second turbo machine 134. The second turbo machine 134 includes second turbine 136 and pump 138. The expanded air exits the second turbine 136 through the expanded air passage 142. A heat exchanger 100 is arranged in the exhaust passage 114 and the passage 132 to heat the charge air before entering the second turbine 136 through heated charge air passage 133.

The controller 80 may also be programmed to regulate other devices 88, such as flow control valves and fans, to regulate the temperature of the fluids within the power plant 10, for example, using a flow control valve in the passage 32.

Although an example embodiment has been disclosed, a worker of ordinary skill in this art would recognize that certain modifications would come within the scope of the claims. For that reason, the following claims should be studied to determine their true scope and content.

What is claimed is:
1. A power plant comprising:
an engine configured to receive charge air and produce exhaust;
a first turbo machine configured to be driven by the exhaust and drive a compressor that receives air, the compressor configured to produce the charge air; and a second turbo machine configured to receive the charge air and rotationally drive a pump in response thereto, the pump configured to receive an EGR from the exhaust and introduce the pumped EGR to the charge air.

2. The power plant according to claim 1, wherein:

said engine comprises a combustion engine having an intake manifold;

said power plant further comprising:

a charge air passage in fluid communication with the intake manifold and configured to supply charge air to the combustion engine;

an exhaust passage in fluid communication with the combustion engine and configured to receive engine exhaust; and an exhaust gas recirculation passage in fluid communication with the exhaust passage and charge air passage, and configured to receive a portion of the engine exhaust.

3. The power plant according to claim 2, wherein the first turbo machine includes a first turbine and a compressor, the first turbine arranged in the exhaust passage and configured to be driven by the exhaust for rotationally driving the compressor, and the compressor configured to compress the air and produce the charge air, and the second turbo machine includes a second turbine and a pump, the second turbine connected to the charge air passage and configured to be driven by the charge air for rotationally driving the pump, the pump arranged in the exhaust gas recirculation passage receiving an EGR from the exhaust passage and introducing the pumped EGR to the charge air passage.

4. The power plant according to claim 3, wherein the second turbine is connected to an expanded air passage, and further comprising a pre-cooler arranged in the exhaust gas recirculation passage and the expanded air passage.

5. The power plant according to claim 4, wherein the combustion engine includes a coolant loop, and the pump is connected to a pumped EGR passage, and further comprising an EGR cooler arranged in the pumped EGR passage and the coolant loop.

6. The power plant according to claim 2, further comprising a cooler arranged in the charge air passage and a fan configured to be in fluid communication with the cooler, and a controller in communication with the fan and configured to energize the fan in response to a predetermined condition.

7. The power plant according to claim 2, further comprising a heat exchanger connected to the charge air passage and the exhaust passage, and wherein the second turbine is arranged downstream from the heat exchanger and configured to receive heated charge air therefrom.

\* \* \* \* \*